(12) United States Patent
Mao (10) Patent No.: US 11,507,427 B2
(45) Date of Patent: Nov. 22, 2022

(54) APPLICATION PROGRAM MANAGEMENT METHOD AND APPARATUS

(71) Applicant: HUAWEI TECHNOLOGIES CO., LTD., Guangdong (CN)

(72) Inventor: Minhua Mao, Shenzhen (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 51 days.

(21) Appl. No.: 17/034,740

(22) Filed: Sep. 28, 2020

(65) Prior Publication Data

US 2021/0011774 A1     Jan. 14, 2021

Related U.S. Application Data

(63) Continuation of application No. PCT/CN2019/078399, filed on Mar. 16, 2019.

(30) Foreign Application Priority Data

Apr. 13, 2018    (CN) .......................... 201810332622.2

(51) Int. Cl.
     *G06F 9/50*          (2006.01)
     *G06F 9/48*          (2006.01)
     *G06F 16/27*        (2019.01)

(52) U.S. Cl.
     CPC .............. *G06F 9/5033* (2013.01); *G06F 9/48* (2013.01); *G06F 9/485* (2013.01); *G06F 9/4806* (2013.01);

(Continued)

(58) Field of Classification Search
     CPC ........ G06F 9/48; G06F 9/4806; G06F 9/4843; G06F 9/485; G06F 9/4856; G06F 9/4881;

(Continued)

(56) References Cited

U.S. PATENT DOCUMENTS

| 8,364,908 | B2 | 1/2013 | Barsness et al. | |
|---|---|---|---|---|
| 2009/0100180 | A1* | 4/2009 | Chidambaran | G06F 9/5088 709/226 |
| 2014/0298332 | A1* | 10/2014 | Cai | G06F 9/5088 718/1 |
| 2015/0135003 | A1* | 5/2015 | Cota-Robles | G06F 12/0815 714/6.3 |

(Continued)

FOREIGN PATENT DOCUMENTS

| CN | 100407153 C | 7/2008 |
|---|---|---|
| CN | 103888501 A | 6/2014 |

(Continued)

*Primary Examiner* — Charles M Swift
(74) *Attorney, Agent, or Firm* — Womble Bond Dickinson (US) LLP (57) ABSTRACT

This application provides an application program management method and apparatus. The method is performed in a database cluster system including at least two database nodes, at least one database object is stored in each database node, and the method includes: running an application program on a first database node in a first time period; determining a target database node based on at least one historical database object accessed by the application program in the first time period, where the target database node stores the historical database object; and running the application program on the target database node in a second time period. According to this application, a database node on which an application program runs can be dynamically adjusted, to avoid overload of the database node.

14 Claims, 4 Drawing Sheets

Method 100

Run an application program #A on a node #1 in a first time period    110

Determine a node #2 based on at least one historical database object accessed by the application program #A in the first time period, where the node #2 stores the historical database object    120

Run the application program #A on the node #2 in a second time period    130

(52) U.S. Cl.
CPC .......... *G06F 9/4843* (2013.01); *G06F 9/4856* (2013.01); *G06F 9/4881* (2013.01); *G06F 9/50* (2013.01); *G06F 9/505* (2013.01); *G06F 9/5005* (2013.01); *G06F 9/5022* (2013.01); *G06F 9/5044* (2013.01); *G06F 9/5061* (2013.01); *G06F 9/5072* (2013.01); *G06F 9/5083* (2013.01); *G06F 9/5088* (2013.01); *G06F 16/27* (2019.01)

(58) Field of Classification Search
CPC ........ G06F 9/50; G06F 9/5005; G06F 9/5022; G06F 9/5033; G06F 9/5038; G06F 9/5044; G06F 9/505; G06F 9/5061; G06F 9/5072; G06F 9/5083; G06F 9/5088; G06F 16/27; G06F 16/278
See application file for complete search history.

(56) References Cited

U.S. PATENT DOCUMENTS

| | | | |
|---|---|---|---|
| 2015/0261459 A1* | 9/2015 | Manoharan | G06F 9/5033 711/114 |
| 2017/0177401 A1 | 6/2017 | Brouwer et al. | |
| 2019/0235922 A1* | 8/2019 | Iovanna | G06F 9/4856 |
| 2019/0236150 A1* | 8/2019 | Zaslavsky | G06F 16/2308 |

FOREIGN PATENT DOCUMENTS

| | | |
|---|---|---|
| CN | 104077187 A | 10/2014 |
| CN | 106844510 A | 6/2017 |
| CN | 107291546 A | 10/2017 |
| CN | 108733484 A | 11/2018 |
| WO | 2007003630 A1 | 1/2007 |
| WO | 2012103920 A1 | 8/2012 |
| WO | 2015171800 A1 | 11/2015 |

* cited by examiner

APPLICATION PROGRAM MANAGEMENT METHOD AND APPARATUS

CROSS-REFERENCE TO RELATED APPLICATIONS

This application is a continuation of International Application No. PCT/CN2019/078399, filed on Mar. 16, 2019, which claims priority to Chinese Patent Application No. 201810332622.2, filed on Apr. 13, 2018. The disclosures of the aforementioned applications are hereby incorporated by reference in their entireties.

TECHNICAL FIELD

This application relates to the field of database cluster technologies, and more particularly, to an application program management method and apparatus.

BACKGROUND

A large-scale application system typically runs on a database cluster system. When the large-scale application system runs on this database cluster with a shared-everything architecture, application partitioning is usually performed, such that an application accessing same or a same type of data runs on a same database node, to reduce data communication between database clusters and avoid performance degradation caused by an increasing amount of traffic between the clusters, so as to avoid application performance degradation.

In an existing partition technology, partitioning is usually performed based on an application module. Each application module runs on a specified database node (Database Instance). This partition mode may cause overload of a database node, for example, overload of a central processing unit (CPU).

SUMMARY

This application provides an application program management method and apparatus, to dynamically adjust a database node on which an application program runs, so as to avoid overload of the database node.

According to a first aspect, an application program management method is provided. The method is performed in a database cluster system including at least two database nodes, at least one database object is stored in each database node, and the method includes: running an application program on a first database node in a first time period; determining a target database node based on at least one historical database object accessed by the application program in the first time period, where the target database node stores the historical database object; and running the application program on the target database node in a second time period.

Based on the foregoing technical solution, according to the application program management method in this embodiment of this application, the target database node may be determined based on the historical database object accessed by the application program, such that the application program running on the first database node is migrated to and runs on the target database node. Compared with the prior art, this method can avoid a problem that an application program of an application module cannot be split to perform adjustment between database nodes when a database node is overloaded. Therefore, in this embodiment of this application, a relationship between an application program and a running database node is dynamic, and may be adjusted based on a load of the database cluster system, a status of a database node on which a database object is located, or the like.

With reference to the first aspect, in embodiments of the first aspect, the running an application program on a first database node in a first time period includes: running a first application module on the first database node in the first time period, where the application program is any application program in the first application module.

The application module is classification of a type of application programs. Running application programs of a same type on a same database node can reduce data communication between database clusters, and avoid performance degradation of the database cluster system caused by an increasing amount of traffic between the clusters, thereby avoiding application performance degradation.

With reference to the first aspect, in embodiments of the first aspect, the method further includes: determining a first application program from the first application module; the determining a target database node based on at least one historical database object accessed by the application program in the first time period includes: calculating a data amount proportion of at least one second database node to obtain at least one value, where the second database node includes the target database node, and the data amount proportion is a proportion of a data amount that the first application program accesses the historical database object on the second database node in the first time period to a total access amount, where the total access amount is a total data amount accessed by the first application program in the first time period; and determining a maximum value in the at least one value, where a database node corresponding to the maximum value is the target database node; and the running the application program on the target database node in a second time period includes: running the first application program on the target database node in the second time period.

One first application program is determined from the first application module, and the first application program is migrated from the first database node to the target database node, to reduce a load of the first database node. In addition, the maximum value means that the first application program accesses a maximum quantity of database objects on the database node. Migrating the first application program to the database node can reduce data communication between the database clusters.

With reference to the first aspect, in embodiments of the first aspect, the running the application program on the target database node in a second time period includes: when central processing unit (CPU) utilization of the target database node is less than a first threshold, running the application program on the target database node in the second time period.

To ensure a load of the target database node, for example, the CPU utilization of the target database node, the CPU utilization of the target database node is further determined before the application program is migrated to the target database node. The application program is migrated to and runs on the target database node only when the CPU utilization of the target database node is less than a threshold.

With reference to the first aspect, in embodiments of the first aspect, the method further includes: collecting running information of the database cluster system in real time, where the running information of the database cluster system includes load information of the database cluster system and information about communication performance of the database cluster system; and determining, based on the running information of the database cluster system, whether the application program runs on the target database node in the second time period.

Adjusting the node on which the application program runs may affect the communication performance of the database cluster system. Therefore, the running information of the database cluster system needs to be collected in real time. The running information includes the load information and the information about the communication performance of the database cluster system. The application program is migrated to and runs on the target database node only when the running information meets a condition. Therefore, not only the database node on which the application program runs can be dynamically adjusted, but also the communication performance of the database cluster system can be ensured.

With reference to the first aspect, in embodiments of the first aspect, the determining whether the application program runs on the target database node in the second time period includes: when the communication performance of the database cluster system meets a first condition, determining that the application program runs on the target database node in the second time period; or when CPU utilization of the first database node exceeds a second threshold, determining that the application program runs on the target database node in the second time period.

When the communication performance of the database cluster system meets a condition, the application program can be migrated. Alternatively, when the CPU utilization of the first database node exceeds a threshold, to reduce the load of the first database node, the application program on the first database node is migrated to and runs on another database node.

With reference to the first aspect, in embodiments of the first aspect, the at least one historical database object is stored on the at least one second database node; and the determining a target database node based on at least one historical database object accessed by the application program in the first time period includes: determining the target database node from the at least one second database node according to a preset mapping relationship, where the mapping relationship is a relationship between the application program and a database node capable of running the application program; and/or determining the target database node from the at least one second database node based on a second application module, where an application program in the second application module runs on the target database node, and the application program and the application program in the second application module are application programs of a same type.

In this embodiment of this application, there are many manners of determining a plurality of database nodes by using the historical database object, and determining the target database node from the plurality of database nodes. In a manner, the database node capable of running the application program may be determined, according to the preset mapping relationship, from the plurality of database nodes. Alternatively, the application program may be configured on a database node on which an application program of a same type runs.

With reference to the first aspect, in embodiments of the first aspect, the method further includes: periodically detecting running information of the application program, where the running information of the application program includes database node information accessed by the application program.

The running information of the application program is periodically detected, and the database node on which the application program runs may be dynamically adjusted based on a running status of the application program and the database node information, to ensure the overall communication performance of the database cluster system.

According to a second aspect, an application program management apparatus is provided. The apparatus includes units configured to perform the operations of the application program management method in any one of the first aspect and the embodiments of the first aspect.

According to a third aspect, an application program management device is provided. The device may be the application program management apparatus in the foregoing method designs, or may be a chip configured in the application program management apparatus. The device includes a processor, a memory, a communications interface, and a bus. The processor, the memory, and the communications interface communicate with each other by using the bus, or may implement communication by wireless transmission or by another means. The memory is configured to store an instruction, and the processor is configured to execute the instruction stored in the memory. The memory stores program code, and the processor may invoke the program code stored in the memory to perform the application program management method in any one of the first aspect and the embodiments of the first aspect.

According to a fourth aspect, a chip system is provided. The chip system includes a processor, and is configured by an application program management apparatus to implement the functions in the foregoing aspects, for example, running, collection, determining, or data and/or information processing in the foregoing method. In one embodiment, the chip system further includes a memory. The memory is configured to store a program instruction and data for the application program management apparatus. Further, the program instruction stored in the memory includes an instruction used to perform the application program management method in any one of the first aspect and the embodiments of the first aspect.

In one embodiment, the chip system may include a chip, or may include a chip and another discrete device.

According to a fifth aspect, a computer program product is provided. The computer program product includes computer program code. When the computer program code is run on a computer, the computer is enabled to perform the application program management method in any one of the first aspect and the embodiments of the first aspect.

According to a sixth aspect, a computer-readable medium is provided. The computer-readable medium stores program code executed by an application program management apparatus. The program code includes an instruction used to perform the application program management method in any one of the first aspect and the embodiments of the first aspect.

In this application, the embodiments provided in the foregoing aspects may be further combined to provide more embodiments.

DESCRIPTION OF EMBODIMENTS

The following describes technical solutions of this application with reference to accompanying drawings.

An application program management method and apparatus provided in embodiments of this application may be applied to a computer. The computer includes a hardware layer, an operating system layer running on the hardware layer, and an application layer running on the operating system layer. The hardware layer includes hardware such as a central processing unit (CPU), a memory management unit (MMU), and a memory (also referred to as a main memory). An operating system may be any one or more computer operating systems that implement service processing by using a process, for example, a Linux operating system, a Unix operating system, an Android operating system, an iOS operating system, or a Windows operating system. The application layer includes applications such as a browser, an address book, word processing software, or instant communications software.

In addition, in the embodiments of this application, the computer may be a handheld device, for example, a smartphone, or may be a terminal device, for example, a personal computer. This is not limited in this application, provided that the computer can run a program recording code of the application program management method in the embodiments of this application, to manage an application program according to the application program management method in the embodiments of this application.

The application program management method in the embodiments of this application may be executed by a computer device or a functional module that is in a computer device and that can invoke and execute a program.

In addition, aspects or features of this application may be implemented as a method, an apparatus or a product that uses standard programming and/or engineering technologies.

The term "product" used in this application covers a computer program that can be accessed from any computer-readable component, carrier or medium. For example, a computer-readable medium may include but is not limited to: a magnetic storage component (for example, a hard disk, a floppy disk or a magnetic tape), an optical disc (for example, a compact disc (CD), a digital versatile disc (DVD), a smart card and a flash memory component (for example, erasable programmable read-only memory (EPROM), a card, a stick, or a key drive).

In addition, various storage media described in this specification may indicate one or more devices and/or other machine-readable media that are configured to store information. The term "machine-readable media" may include but is not limited to a radio channel, and various other media that can store, include, and/or carry an instruction and/or data.

For ease of understanding the embodiments of this application, an architecture of a system applicable to the application program management method according to the embodiments of this application is first described in detail with reference to FIG. 1.

Figure 1:
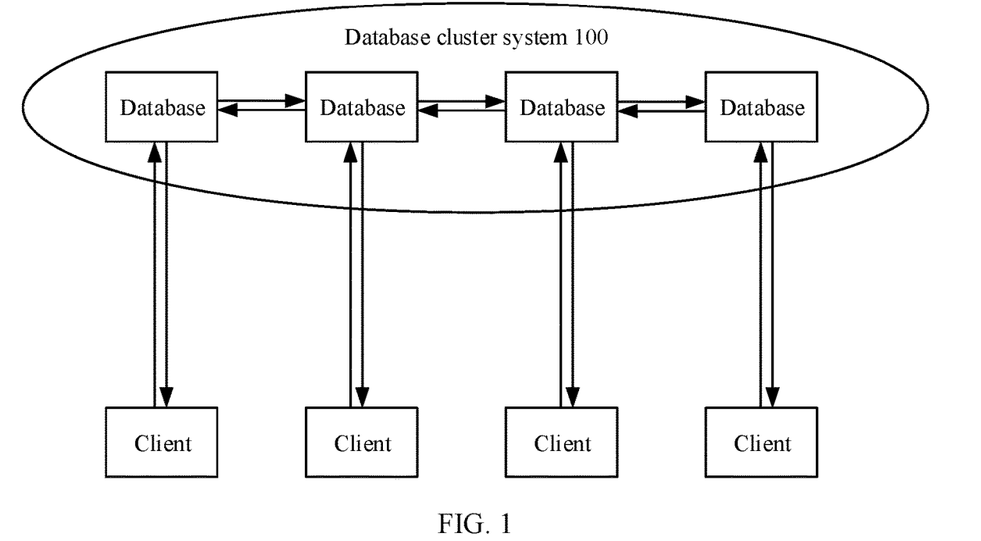
FIG. 1 is a schematic diagram of a system applicable to an application program management method according to an embodiment of this application.

FIG. 1 is a schematic diagram of a system 100 applicable to an application program management method according to an embodiment of this application. FIG. 1 shows a database cluster system 100 applicable to this embodiment of this application, and the database cluster system 100 may include a database and a client. The database may also be understood as a database node, and the client may also be understood as an application program or an application module.

A database cluster is first described.

The database cluster, as the name implies, is a virtual single database logical image constituted by using at least two or more database servers and providing transparent a data service for a client like a single database system. Currently, a large-scale application system typically runs on a database cluster system. As shown in FIG. 1, each database can independently process a task for the client. The database cluster system is the core of an information system. Therefore, in addition to service logic, a user is concerned about system performance. Performance issues involve hardware, software, network, application design architecture, code quality, and the like. If the database cluster system can provide a load balancing capability and an automatic optimization capability, the overall system performance is greatly improved.

An enterprise resource planning (ERP) system, Oracle E-Business Suite (EBS), is used as an example. A background database system of the E-Business Suite usually runs on a database cluster of a real application cluster (RAC) of the Oracle. The RAC provides automatic load management for services. The service is a group of application programs or a type of application programs, and the application programs include service components corresponding to application program loads. A continuous database operation is performed on the services in the RAC, and a plurality of services in a plurality of instances are supported. The services are allocated to one or more instances and run on an alternative instance that can be used as a backup instance. If a primary instance is faulty, the Oracle transfers a service from the faulty instance to an alternative instance still running. The Oracle further automatically performs connection load balancing between instances running services.

In the RAC, a plurality of low-cost computers work together and perform database processing, used as a large-scale computer, and the RAC may be used for various application programs. When a large-scale application system runs on this database cluster with a shared-everything architecture, application partitioning is usually performed, such that an application accessing same or a same type of data runs on a same database node, to reduce data communication between database clusters.

Figure 2:
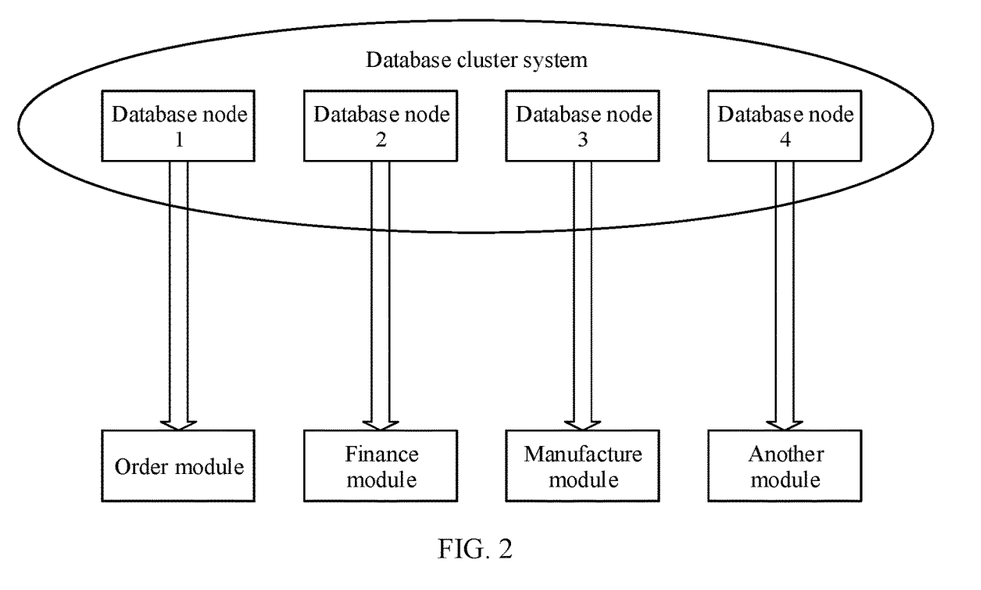
FIG. 2 is a schematic diagram of implementing application partitioning based on an application module.

In one embodiment, partitioning is performed based on an application module. As shown in FIG. 2, each application module includes one or more application programs. A program of an order module runs on a database node 1, a program of a finance module runs on a database node 2, a program of a manufacture module runs on a database node 3, and a program of another module runs on a database node 4. Programs of different application modules run on different database nodes, and programs of a same module run on a same database node to implement application partitioning. In this manner, in which partitioning is performed based on the application module, a granularity is relatively coarse, and loads of the different application modules may be different. Therefore, load imbalance is easily caused. In addition, if partitioning is performed based on the application module, programs of the application modules cannot be split for inter-node allocation.

Therefore, this application provides an application program management method, to dynamically adjust a database node on which an application program runs, so as to avoid load imbalance between database nodes.

To facilitate understanding of the embodiments of this application, the following first briefly describes several concepts by using Table 1.

TABLE 1

| Column names | Descriptions |
|---|---|
| Application module | is classification of a type of application program, and is an application module corresponding to an application program |
| Application program ID | ID of an application program |
| Application program name | Name of an application program |
| Application program DAPM type | Define a status of a node on which an application program may run. The application program can run on only one database node or a plurality of database nodes |
| Mapping relationship between an application program and a database node | May be represented by a value, where the value is a correspondence between the application program and a database node on which the application program may run |
| CPU threshold | CPU threshold for triggering an application program to perform node migration |
| Communication performance indicator of the database cluster system | Indicator for ensuring that the communication performance of the cluster is maintained at a specific level after the application program performs node migration. |

A dynamic application partitioning method (DAPM) is an information collection framework and algorithm provided in the embodiments of this application. According to the DAPM, a database node on which an application program runs is determined based on collected application program information, system load information during running of the application program, and the like. A definition of the application program DAPM type is shown in Table 2.

Eight database nodes are used as an example. A form of a mapping relationship between an application program and a database node is shown in Table 3.

Values in Table 3 are used to indicate mapping relationships between application programs and database nodes.

For example, $16=2^4$, it indicates that an application program can run only on a node 5.

For another example, $200=2^7+2^6+2^3$, it indicates that an application program may run on a node 4, a node 7, or a node 8.

For another example, $255=2^7+2^6+2^5+2^4+2^3+2^2+2^1+2^0$, it indicates that an application program may run on a node 1, a node 2, a node 3, a node 4, a node 5, a node 6, a node 7, or a node 8.

For another example, $3=2^1+2^0$, it indicates that an application program may run on a node 1 or a node 2.

It should be understood that the specific form and the indicated information of the mapping relationship are merely examples for description. When a function (to be specific, used to indicate a database node on which an application program runs) of the mapping relationship can be implemented, any change may be made to the specific form and the indicated information of the mapping relationship. This embodiment of this application is not limited thereto.

TABLE 2

| Application program DAPM types | Descriptions |
|---|---|
| 0 | A program can run on only one node and cannot be migrated to another database node. |
| 1 | A program can run on only one database node, but can be migrated to another node. |
| 2 | Considering load balance, a program may run on a maximum of two database nodes. |
| 3 | Considering load balance, a program may run on a maximum of three database nodes. |
| 4 | Considering load balance, a program may run on a maximum of four database nodes. |
| 5 | Considering load balance, a program may run on a maximum of five database nodes. |
| 6 | Considering load balance, a program may run on a maximum of six database nodes. |
| 7 | Considering load balance, a program may run on a maximum of seven database nodes. |
| 8 | Considering load balance, a program may run on a maximum of eight database nodes. |

TABLE 3

| Values | Bit 8 | Bit 7 | Bit 6 | Bit 5 | Bit 4 | Bit 3 | Bit 2 | Bit 1 | Mapping nodes |
|---|---|---|---|---|---|---|---|---|---|
| 16 | 0 | 0 | 0 | 1 | 0 | 0 | 0 | 0 | A program can run only on a node 5. |
| 200 | 1 | 1 | 0 | 0 | 1 | 0 | 0 | 0 | A program may run on a node 4, a node 7, or a node 8. |
| 255 | 1 | 1 | 1 | 1 | 1 | 1 | 1 | 1 | A program may run on any node (a node 1 to a node 8). |
| 3 | 0 | 0 | 0 | 0 | 0 | 0 | 1 | 1 | A program may run on a node 1 or a node 2. |

The CPU threshold is a threshold of CPU utilization. The CPU utilization is a CPU resource occupied by a running program. The CPU utilization indicates a status in which a machine runs a program at a time point. Higher CPU utilization indicates more programs run by the machine at this time point, and lower CPU utilization indicates few programs run by the machine at this time point. The CPU threshold may be preset based on experience, or may be further set based on respective application statuses. This is not limited herein. For example, the CPU threshold may be 90%, and in one embodiment, when CPU utilization of a database node exceeds 90%, it indicates that the database node is overloaded.

The communication performance indicator of the cluster is an indicator that the communication performance of the cluster meets. Adjusting the node on which an application program runs affects the communication performance of the database cluster system. Therefore, when the node on which the application program runs is adjusted, it is ensured that the communication performance of the cluster needs to be maintained at a specific level. For example, a time consumed by cluster communication does not exceed 10% of a total system time.

It should be noted that, in the embodiments of this application, the "application program" may be a computer program that completes one or more tasks. The "application program" runs in a user mode, may interact with a user, and has a visible user interface. The nouns "application program" and "program" are often used alternately, and a person skilled in the art understands meanings of the nouns.

It should be further noted that, in the embodiments of this application, "adjusting an application program" means migrating an application program running on one database node to another database node for running. A person skilled in the art understands a meaning of this.

It should be further noted that, in the embodiments of this application, the "database node" and the "node" may be sometimes used together. It should be noted that meanings expressed by the "database node" and the "node" are the same when a difference between the "database node" and the "node" is not emphasized. Terms "access object" and "access database object" may be used together sometimes. It should be noted that meanings expressed by the "access object" and the "access database object" are the same when a difference between the "access object" and the "access database object" is not emphasized.

It should be further noted that, in this application, the "first", the "second", the "third", and the like are merely intended to distinguish different objects, for example, distinguish different database nodes and distinguish different application programs, and should not constitute any limitation on this application.

It should be noted that the term "and/or" describes an association relationship for describing associated objects and represents that three relationships may exist. For example, A and/or B may represent the following three cases: Only A exists, both A and B exist, and only B exists. The character "/" usually indicates an "or" relationship between the associated objects. The term "at least one" means one or more. The term "at least one of A and B", similar to the term "A and/or B", describes an association relationship between associated objects and represents that three relationships may exist. For example, at least one of A and B may represent the following three cases: Only A exists, both A and B exist, and only B exists.

Figure 3:
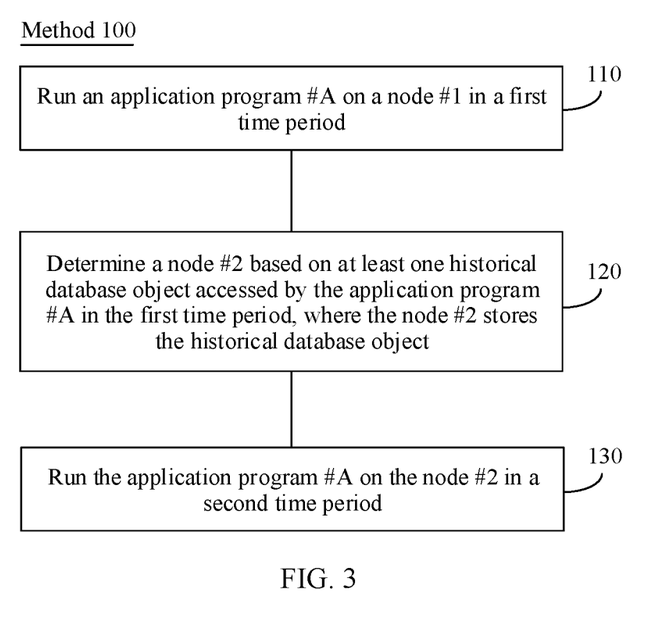
FIG. 3 is a schematic flowchart of an application program management method according to an embodiment of this application.

The following describes in detail the technical solutions provided in this application with reference to the accompanying drawings. In FIG. 3, an application program (denoted as an application program #A below for ease of understanding and description) is adjusted from a first database node (denoted as a node #1 below for ease of understanding and description) to a target database node (denoted as a node #2 below for ease of understanding and description).

FIG. 3 is a schematic diagram of an application program management method 100 according to an embodiment of this application. The method 100 is performed in a database cluster system including at least two database nodes. For example, the method may be used in the database cluster system 100. The method 100 includes operations 110 to 130, and the following describes the operations in detail.

110: Run the application program #A on the node #1 in a first time period.

One application program or a plurality of application programs may run on the node #1, and the plurality of application programs may belong to a same application module or different application modules. This is not limited in this embodiment of this application.

In one embodiment, before the application program #A runs on the node #1 in the first time period, the method includes: determining the node #1 according to a preset mapping relationship, where the mapping relationship is a relationship between the application program #A and the node #1; determining the node #1 based on a historical database object accessed by the application program #A; or determining the node #1 based on an application module #A (namely, an example of a second application module). An application program in the application module #A runs on the node #1, and the application program #A and the application program in the application module #A are application programs of a same type.

The following further describes manners of determining the node #1. In this embodiment of this application, there are many manners of determining the node #1, and at least the following three manners are included.

Manner 1

The node #1 is determined according to the preset mapping relationship.

For example, a node on which the application program #A may run is determined according to the mapping relationship shown in Table 3. Further, it is assumed that it is determined, according to the mapping relationship, that the application program #A may run on the node 4, the node 7, or the node 8. In one embodiment, a node with a low load is selected from the node 4, the node 7, and the node 8 as the node #based on specific statuses (for example, a load status) of the node 4, the node 7, and the node 8, to run the application program #A. In one embodiment, the node #1 is determined based on types of application programs running on the node 4, the node 7, and the node 8. In one embodiment, a node that runs an application program of a same type as the application program #A is selected as the node #1. In one embodiment, a node is randomly determined from the node 4, the node 7, and the node 8 as the node #1. Embodiments are not limited in this application.

Manner 2

The node #1 is determined based on the historical database object accessed by the application program #A.

Each database node stores at least one database object. The database object includes a table, an index, a view, a chart, a default value, a rule, a trigger, a user, a function, and the like. For example, a table in a database is similar to a table used in daily life, and the table also includes a row and a column. The column, also referred to as a field, includes a same type of information, and a title of each column is a field name. The row includes several columns of information items. A row of data is referred to as a record, and represents a meaningful combination of information. One database table includes one or more records, and a table without a record is referred to as an empty table. Each table typically has a primary key used to uniquely determine a record. For another example, the index is a sequence established based on a specified database table column. The index provides quick access to data and table data can be monitored to ensure that the data in the column to which the index points is unique, for example, a clustered index.

In one embodiment of this application, program information is collected and analyzed. For example, a main code of an application program and a mainly accessed database object are periodically collected. Proportions of the code and the accessed object are quantified while the code and the accessed object are collected. A database node on which the application program runs is determined based on the proportions. For example, in historical access, which database node is a primary node of a database object most frequently accessed by the application program #A, and the database node is determined as the node #1.

Manner 3

The node #1 is determined based on the application module #A.

The application module #A includes a plurality of application programs, and the plurality of application programs run on one database node. If the application program #A also belongs to the application module #A, in one embodiment, the application program #A and the application program in the application module #A are application programs of a same type, the database node is determined as the node #1. Running application programs of a same type on a same database node can reduce data communication between database clusters, and avoid performance degradation of the database cluster system caused by an increasing amount of traffic between the clusters, thereby avoiding application performance degradation.

It should be understood that the foregoing three manners of determining the node #1 are merely examples for description. This embodiment of this application is not limited thereto. Other manners in which the node #1 can be determined all fall within the protection scope of this application. For example, a node is randomly determined as the node #1.

In one embodiment, running information of the application program is periodically detected, where the running information of the application program includes database node information accessed by the application program.

The running information of the application program is periodically detected, and the database node on which the application program runs may be dynamically adjusted based on a running status of the application program and the database node information, to ensure overall communication performance of the database cluster system.

120: Determine the node #2 based on at least one historical database object accessed by the application program #A in the first time period, where the node #2 stores the historical database object.

Each database node stores at least one database object. An application program accesses database objects, and in one embodiment, accesses database nodes including these database objects.

Figure 4:
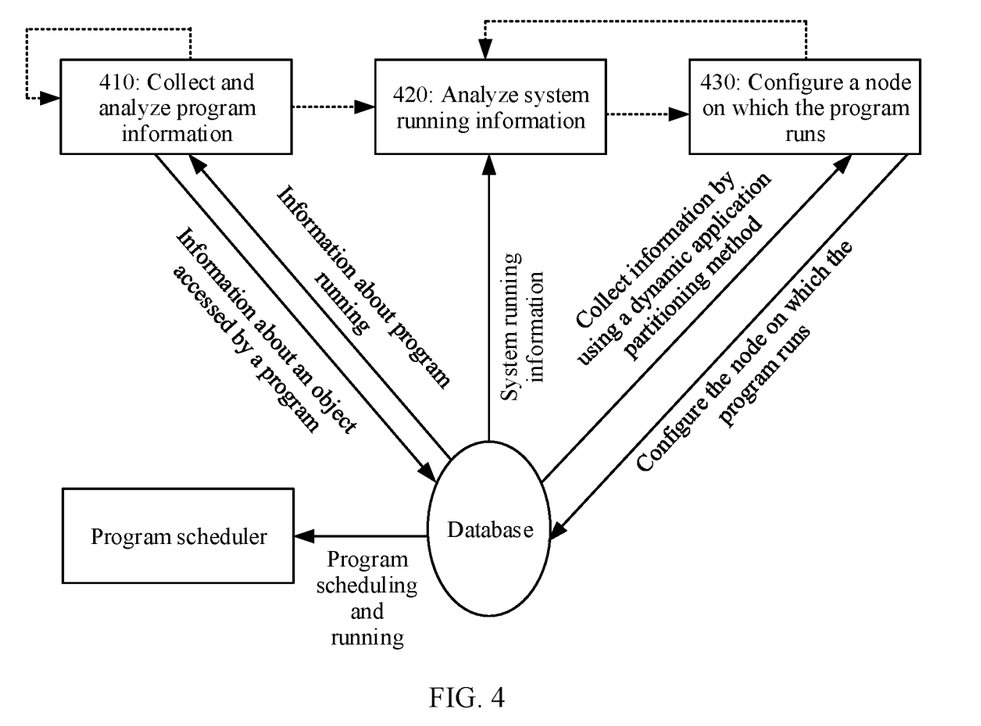
FIG. 4 is a schematic logic diagram of an application program management method applicable to an embodiment of this application.

As described above, in this embodiment of this application, the program information is collected and analyzed. FIG. 4 is a schematic logic diagram of an application program management method applicable to an embodiment of this application. FIG. 4 includes 410: Collect and analyze program information. The information about program running is collected, and analyzed to obtain information about an object accessed by the program, and in one embodiment, a database object mainly accessed by the program. Proportions of code and the accessed object are quantified while the code and the accessed object are collected. Table 4 shows an example. An example in which the application program #A is HWPROGA is used, and access objects (namely, accessed database objects) of HWPROGA include TAB1, IDX1, TAB2, IDX2, TAB3, and IDX3. An accessed data amount percentage is a percentage of a data amount accessed by these database objects to a data amount accessed in an entire running process of HWPROGA.

It can be seen from Table 4 that the database object mainly accessed by HWPROGA is TAB2.

FIG. 4 further includes 420: Analyze system running information. In one embodiment, running information of the database cluster system is collected in real time, where the running information of the database cluster system includes load information of the database cluster system and information about the communication performance of the database cluster system. Whether the application program #A runs on the node #2 in a second time period is determined based on the running information of the database cluster system.

Adjusting the node on which an application program runs may affect the communication performance of the database cluster system. Therefore, the running information of the database cluster system needs to be collected in real time. The application program is migrated to and runs on the target database node when the running information meets a specific condition. Therefore, not only the database node on which the application program runs can be dynamically adjusted, but also the communication performance of the database cluster system can be ensured.

The running information of the database cluster system includes a system load, a cluster system communication performance status, information about a primary node of a database object, and the like. For details, see Table 5.

TABLE 4

| Program names | Accessed objects | Access data amount proportions |
|---|---|---|
| HWPROGA | TAB1 | 21.64% |
| HWPROGA | IDX1 | 12.5% |
| HWPROGA | TAB2 | 30.05% |
| HWPROGA | IDX2 | 12.01% |
| HWPROGA | TAB3 | 16.98% |
| HWPROGA | IDX3 | 6.188% |

TABLE 5

| Information factors | Descriptions |
|---|---|
| A primary node on which a database object is located | A database node on which a program should run is determined mainly based on a database node on which a database object accessed by the program is located. This information is a primary database node corresponding to each database object collected from the system. |
| CPU utilization | CPU utilization of a current node in the database cluster system. The CPU utilization changes in real time. If a database node on which a program runs is adjusted, the CPU utilization is also affected. |
| Communication performance of the cluster | When a node on which the program runs is adjusted, the communication performance of the database cluster system is affected. Therefore, the communication performance of the cluster needs to collected in real time. Generally, the node on which the |

TABLE 5-continued

| Information factors | Descriptions |
|---|---|
| | program runs can be adjusted only when the communication performance of the cluster is within an acceptable range. |

TABLE 6

| Database object names | Primary nodes |
|---|---|
| TAB1 | 2 |
| IDX1 | 2 |
| TAB2 | 3 |
| IDX2 | 3 |
| TAB3 | 2 |
| IDX3 | 2 |

A database node to which an application program is migrated may be determined based on the information about the primary node on which the database object is located. By collecting database objects accessed by the application program #A, database nodes on which the accessed objects are located are further determined, and the node #2 may be determined. The application program HWPROGA is still used as an example. Table 4 lists the access objects of the application program HWPROGA, and Table 6 shows information about the primary nodes on which these access objects are located.

It can be seen from Table 6 that nodes accessed by HWPROGA include the node 2 and the node 3.

FIG. 4 further includes: 430: Configure the node on which the program runs. In one embodiment, information about the node #2 is obtained through analysis based on 410 and 420, such that the information is dynamically set. Alternatively, a setting suggestion may be provided according to a program, and a setting is performed based on a requirement after manual determining.

In one embodiment, the operation of determining the node #2 based on at least one historical database object accessed by the application program #A in the first time period includes: calculating a data amount proportion of at least one second database node to obtain at least one value, where the at least one historical database object is stored on the at least one second database node, the data amount proportion is a proportion of a data volume that the application program #A accesses the historical database object on the second database node in the first time period to a total access amount, and the total access amount is a total data amount accessed by the application program #A in the first time period; and determining a maximum value in the at least one value, where a database node corresponding to the maximum value is the node #2. The operation of running the application program #A on the node #2 in a second time period includes: running the application program #A on the node #2 in the second time period.

The maximum value means that the application program #A accesses a maximum quantity of database objects on the database node. Migrating the application program #A to the database node can reduce data communication between the database clusters. A data amount proportion of each database node may be determined by using Table 6 and Table 4, as shown in Table 7.

TABLE 7

| Database nodes | Primary nodes on which database objects are located | Node scores |
|---|---|---|
| 1 | N/A | 0 |
| 2 | TAB1, IDX1, TAB3, and IDX3 | 21.64 + 12.5 + 16.98 + 6.188 = 57.308 |
| 3 | TAB2 and IDX2 | 30.05 + 12.01 = 42.06 |
| 4 | N/A | 0 |

It can be learned from Table 7 that a score (and in one embodiment, an example of a data amount proportion of a database node) of each node is obtained. The higher the score of the node is, the larger the data amount proportion is and the more frequently the application program HWPROGA accesses the database object of the node. A maximum value of the data amount proportion corresponds to the node 2. Therefore, a target database node (namely, the node #2) of the application program HWPROGA may be determined as the node 2.

In one embodiment, the at least one historical database object is stored on the at least one second database node; and the operation of determining the target database node based on at least one historical database object accessed by the application program in the first time period includes: determining the target database node from the at least one second database node according to a preset mapping relationship, where the mapping relationship is a relationship between the application program and a database node capable of running the application program; and/or determining the target database node from the at least one second database node based on a second application module, where an application program in the second application module runs on the target database node, and the application program and the application program in the second application module are application programs of a same type.

In one embodiment, it can be seen from Table 6 that the nodes accessed by HWPROGA include the node 2 and the node 3. The target database node is determined according to a mapping relationship between HWPROGA and a database node that can run HWPROGA. For example, assuming that it is determined, according to the mapping relationship, that the database node that can run HWPROGA include the node 3, but does not include the node 2, it is determined that the node 3 is the target database node.

In one embodiment, a database node with a highest score (the node 2) and a database node with a second highest score (the node 3) are selected from Table 7. Assuming that it is determined, according to the mapping relationship, that the database node that can run HWPROGA include the node 3, but does not include the node 2, it is determined that the node 3 is the target database node.

In one embodiment, assuming that an application program that belongs to a same application module as HWPROGA runs on the node 3, regardless of whether the node 3 has a highest score, it is determined that the node 3 is the target database node.

It should be noted that the foregoing several possible embodiments are merely examples for description, and these embodiment of this application are not limited thereto. For example, it is determined, according to the mapping relationship, that the database node that can run HWPROGA include the node 3, but does not include the node 2. However, a score of the node 2 is the highest, and a score of the node 3 is very low. Therefore, it is still determined that the node 2 with a higher score is the target database node.

In addition, a program scheduler is further included in FIG. 4 and may be configured to schedule a program for running. Partition setting based on an application module is generally static and fixed, is typically configured at a system setting layer (for example, implemented by configuring different managers), and cannot be dynamically adjusted based on a program running change. Modifying the setting generally affects system availability, and is not flexible enough. The program scheduler in this embodiment of this application may flexibly schedule a program, and adjust a database node on which an application program runs.

130: Run the application program #A on the node #2 in the second time period.

After the node #2 is determined, migrating the application program #A to the node #2 for running needs to meet a specific condition. The following describes the details.

In one embodiment, the operation of determining whether the application program #A runs on the node #2 in a second period includes: when the communication performance of the database cluster system meets a first condition, determining that the application program #A runs on the node #2 in the second period; or when CPU utilization of the node #1 exceeds a second threshold, determining that the application program #A runs on the node #2 in the second time period.

Further, the operation of determining that the application program #A runs on the node #2 in the second period includes at least the following three cases.

Case 1

The communication performance of the database cluster system meets the first condition.

In one embodiment, the first condition may be that a time consumed by cluster communication exceeds 10% of all consumed time of the system. The first condition is met, and in one embodiment, when the time consumed by cluster communication exceeds 10% of the all consumed time of the system, application partitioning is adjusted to reduce the time consumed by cluster communication. In one embodiment, the application program #A running on the node #1 is migrated to the node #2 for running.

Case 2

The CPU utilization of the node #1 exceeds the second threshold.

Further, when the CPU utilization of the node #1 (a node on which the application program #A currently runs) exceeds a CPU threshold (namely, an example of the second threshold), the node on which the application program #A runs is modified. In this way, a load of the node #1 can be reduced. Herein, the second threshold may be preset based on experience, or may be further set based on respective application statuses. This is not limited herein. For example, the second threshold may be 90%.

In one embodiment, the operation of running the application program #A on the node #1 in a first time period includes: running a first application module on the node #1 in the first time period, where the application program #A is any application program in the first application module.

When the CPU utilization of the node #1 exceeds the second threshold, in one embodiment, a first application program is determined from the first application module. The first application program may be an application program whose primary node of a mainly accessed database object is not the node #1. Alternatively, the first application program may be an application program that consumes most system resources. Alternatively, the first application program may also be any application program.

Case 3

A primary node on which an object mainly accessed by the application program #A is located is not the same node as a database node on which the application program #A runs.

Further, if the primary node on which the database object mainly accessed by the application program #A is located is the node #1, and the application program #A runs on the node #1, the node on which the application program #A runs is not changed, that is, the application program #A still runs on the node #1.

It should be understood that the foregoing three cases are merely examples for description, and this embodiment of this application is not limited thereto.

In one embodiment, the operation of running the application program #A on the node #2 in a second time period includes: when central processing unit CPU utilization of the node #2 is less than a first threshold, running the application program #A on the node #2 in the second time period.

When the application program #A is migrated from the node #1 to the node #2, current CPU utilization of the node #2 needs to be determined. The application program #A can be migrated to the node #2 for running only when the CPU utilization of the node #2 is less than the first threshold (namely, a CPU threshold). In this way, a load of the node #2 can be ensured. Herein, the first threshold may be preset based on experience, or may be set based on respective application statuses. This is not limited herein. For example, the first threshold may be 90%.

It should be noted that the first time period and the second time period in the embodiments of this application are merely used to indicate that the application program may be adjusted from one database node to another database node for running, and do not limit the protection scope of this embodiment of this application. For example, a periodic time period may be set, and the first time period and the second time period herein represent two consecutive periods.

It should be understood that sequence numbers of the foregoing processes do not mean execution sequences in the embodiments of this application. The execution sequences of the processes should be determined according to functions and internal logic of the processes, and should not be construed as any limitation on the implementation processes of the embodiments of this application.

Based on the foregoing technical solution, according to the application program management method in this embodiment of this application, the target database node may be determined based on the historical database object accessed by the application program, such that the application program running on the first database node is migrated to and runs on the target database node. Compared with the prior art, this method can avoid a problem that an application program of an application module cannot be split to perform adjustment between database nodes when a database node is overloaded. Therefore, in this embodiment of this application, a relationship between an application program and a running database node is dynamic, and may be adjusted based on a load of the database cluster system, a status of a database node on which a database object is located, and the like.

Figure 5:
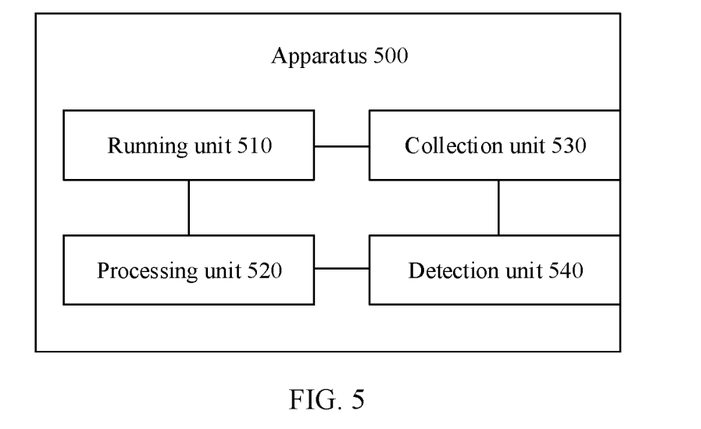
FIG. 5 is a schematic diagram of an application program management apparatus according to an embodiment of this application.

FIG. 5 is a schematic diagram of an application program management apparatus 500 according to an embodiment of this application. It should be understood that the application program management apparatus 500 shown in FIG. 5 is merely an example, and the application program management apparatus in this embodiment of this application may further include another module or unit. The application program management apparatus 500 is configured to perform the actions or the processing processes performed in the system 100, the method 100, and FIG. 4. To avoid repetition, detailed descriptions thereof are omitted.

The apparatus 500 is applied to a database cluster system including at least two database nodes, where at least one database object is stored in each database node, and the apparatus 500 includes:

a running unit 510, configured to run an application program on a first database node in a first time period; and a processing unit 520, configured to determine a target database node based on at least one historical database object accessed by the application program in the first time period, where the target database node stores the historical database object; where the running unit 510 is further configured to run the application program on the target database node in a second time period.

In one embodiment, the running unit 510 is further configured to run a first application module on the first database node in the first time period, where the application program is any application program in the first application module.

In one embodiment, the processing unit 520 is further configured to determine a first application program from the first application module.

The processing unit 520 is further configured to:

calculate a data amount proportion of at least one second database node to obtain at least one value, where the at least one historical database object is stored on the at least one second database node, and the data amount proportion is a proportion of a data amount that the first application program accesses the historical database object on the second database node in the first time period to a total access amount, where the total access amount is a total data amount accessed by the first application program in the first time period; and determine a maximum value in the at least one value, where a database node corresponding to the maximum value is the target database node.

The running unit 510 is further configured to run the first application program on the target database node in the second time period.

In one embodiment, the running unit 510 is configured to: when central processing unit CPU utilization of the target database node is less than a first threshold, run the application program on the target database node in the second time period.

In one embodiment, the apparatus 500 further includes a collection unit 530. The collection unit 530 is configured to collect running information of the database cluster system in real time, where the running information of the database cluster system includes load information of the database cluster system and information about communication performance of the database cluster system.

The processing unit 520 is configured to determine, based on the running information of the database cluster system, whether the application program runs on the target database node in the second time period.

In one embodiment, the processing unit 520 is further configured to:

when the communication performance of the database cluster system meets a first condition, determine that the application program runs on the target database node in the second time period; or when CPU utilization of the first database node exceeds a second threshold, determine that the application program runs on the target database node in the second time period.

In one embodiment, the at least one historical database object is stored on the at least one second database node, and the processing unit 520 is further configured to: determine the target database node from the at least one second database node according to a preset mapping relationship, where the mapping relationship is a relationship between the application program and a database node capable of running the application program; and/or determine the target database node from the at least one second database node based on a second application module, where an application program in the second application module runs on the target database node, and the application program and the application program in the second application module are application programs of a same type.

The apparatus 500 further includes a detection unit 540. The detection unit 540 is configured to periodically detect running information of the application program, where the running information of the application program includes database node information accessed by the application program.

Figure 6:
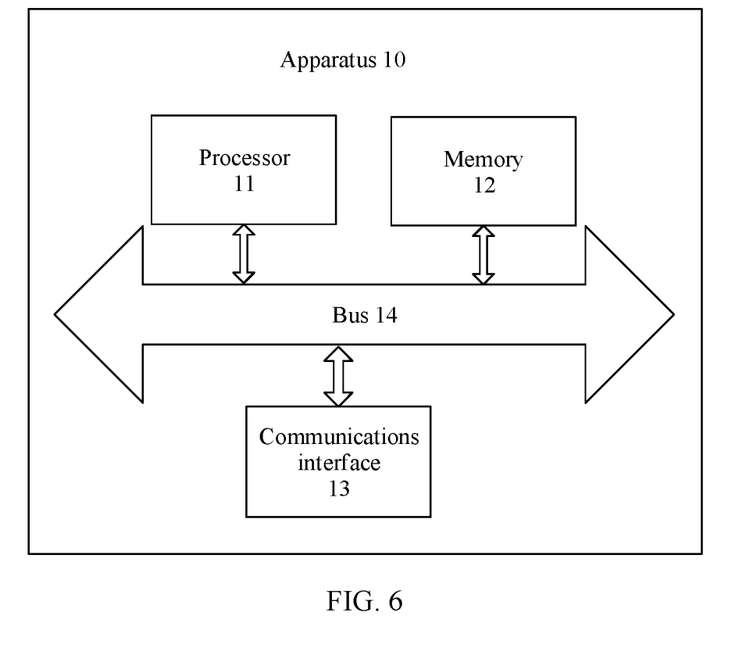
FIG. 6 is another schematic diagram of an application program management apparatus according to an embodiment of this application.

FIG. 6 is another schematic diagram of an application program management apparatus 10 according to an embodiment of this application. The apparatus 10 includes a processor 11, a memory 12, a communications interface 13, and a bus 14. The processor 11, the memory 12, and the communications interface 13 (for example, a network adapter) communicate with each other by using the bus 14, or may implement communication by wireless transmission or by another means. The memory 12 is configured to store an instruction, and the processor 11 is configured to execute the instruction stored in the memory 12. The memory 12 stores program code, and the processor 11 may invoke the program code stored in the memory 12, to control the communications interface 13 to receive and send information or a signal, such that the apparatus 10 performs the functions, the actions or the processing processes performed in the system 100 and the method 100 or FIG. 4.

Further, the processor 11 may invoke the program code stored in the memory 12 to perform the following operations:

running an application program on a first database node in a first time period;

determining a target database node based on at least one historical database object accessed by the application program and collected by using the communications interface 13 in the first time period, where the target database node stores the historical database object; and running the application program on the target database node in a second time period.

It should be understood that the apparatus 10 may correspond to (for example, configured in or is) the system 100 and method 100 or FIG. 4. The modules or the units in the apparatus 10 are respectively configured to perform the functions and the actions or the processing processes performed in the system 100 and the method 100 or FIG. 4. To avoid repetition, detailed descriptions thereof are omitted.

In this embodiment of this application, the processor may be a CPU, or the processor may be another general-purpose processor, a digital signal processor (DSP), an application-specific integrated circuit (ASIC), a field programmable gate array (FPGA), or another programmable logic device, discrete gate or transistor logic device, discrete hardware component, or the like. The general-purpose processor may be a microprocessor or any conventional processor or the like.

It should understand that the embodiments of this application may be applied to the processor, or implemented by the processor. The processor may be an integrated circuit chip and has a signal processing capability. In an implementation process, operations in the foregoing method embodiments can be implemented by using a hardware integrated logical circuit in the processor, or by using instructions in a form of software. The processor may be a general-purpose processor, a digital signal processor (DSP), an application-specific integrated circuit (ASIC), a field programmable gate array (FPGA) or another programmable logical device, a discrete gate or transistor logic device, or a discrete hardware component. The processor may implement or perform the methods, the operations, and the logical block diagrams that are disclosed in the embodiments of this application. The general-purpose processor may be a microprocessor, or the processor may be any conventional processor or the like. Operations of the methods disclosed with reference to the embodiments of this application may be directly executed and accomplished by using a hardware decoding processor, or may be executed and accomplished by using a combination of hardware and a software module in the hardware decoding processor. The software module may be located in a mature storage medium in the art, for example, a random access memory, a flash memory, a read-only memory, a programmable read-only memory, an electrically erasable programmable memory, or a register. The storage medium is located in the memory, and the processor reads information in the memory and accomplishes the operations in the foregoing methods in combination with hardware of the processor.

It should be understood that the memory may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. In an example without a limitation, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus random access memory (DR RAM).

It should further be understood that, the bus may include a power bus, a control bus, a status signal bus, and the like, in addition to a data bus. However, for clear description, various types of buses in the figure are marked as the bus.

A person of ordinary skill in the art may be aware that, in combination with the examples described in the embodiments disclosed in this specification, units and algorithm operations may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein.

In the several embodiments provided in this application, it should be understood that the disclosed system, apparatus, and method may be implemented in another manner. For example, the described apparatus embodiments are merely examples. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the operations of the methods described in the embodiments of this application. The foregoing storage medium includes any medium that can store program code, for example, a USB flash drive, a removable hard disk, a read-only memory (ROM), a random access memory (RAM), a magnetic disk, or an optical disc.

The foregoing descriptions are merely embodiments of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An application program management method comprising:
 running an application program on a first database node in a first time period including running a first application module on the first database node in the first time period, wherein the application program is any application program in the first application module, wherein, the first database node is a database node in a database cluster system comprising at least two database nodes, and at least one database object is stored in each database node;

determining a target database node based on at least one historical database object accessed by the application program in the first time period, wherein the target database node stores the historical database object;

determining a first application program from the first application module, wherein, the determining the target database node based on at least one historical database object accessed by the application program in the first time period comprises: calculating a data amount proportion of at least one second database node to obtain at least one value, wherein the at least one historical database object is stored on the at least one second database node, and the data amount proportion is a proportion of a data amount that the first application program accesses the historical database object on the second database node in the first time period to a total access amount, wherein the total access amount is a total data amount accessed by the first application program in the first time period, and determining a maximum value in the at least one value, wherein a database node corresponding to the maximum value is the target database node; and running the first application program on the target database node in a second time period.

2. The method according to claim 1, wherein the method further comprises:

collecting running information of the database cluster system in real time, wherein the running information of the database cluster system comprises load information of the database cluster system and information about communication performance of the database cluster system; and determining, based on the running information of the database cluster system, whether the application program runs on the target database node in the second time period.

3. The method according to claim 2, wherein the determining whether the application program runs on the target database node in the second time period comprises:

determining that the application program runs on the target database node in the second time period when the communication performance of the database cluster system meets a first condition.

4. The method according to claim 2, wherein the determining whether the application program runs on the target database node in the second time period comprises:

determining that the application program runs on the target database node in the second time period when CPU utilization of the first database node exceeds a second threshold.

5. The method according to claim 1, wherein the at least one historical database object is stored on the at least one second database node; and wherein, the determining a target database node based on at least one historical database object accessed by the application program in the first time period comprises:

determining the target database node from the at least one second database node according to a preset mapping relationship, wherein the mapping relationship is a relationship between the application program and a database node capable of running the application program.

6. The method according to claim 1, wherein the at least one historical database object is stored on the at least one second database node; and wherein, the determining a target database node based on at least one historical database object accessed by the application program in the first time period comprises:

determining the target database node from the at least one second database node based on a second application module, wherein an application program in the second application module runs on the target database node, and the application program and the application program in the second application module are application programs of a same type.

7. The method according to claim 1, wherein the method further comprises:

periodically detecting running information of the application program, wherein the running information of the application program comprises database node information accessed by the application program.

8. An application program management apparatus, wherein the apparatus is applied to a database cluster system comprising at least two database nodes, wherein, at least one database object is stored in each database node, the apparatus comprising:

a processor configured to run an application program on a first database node in a first time period including running a first application module on the first database node in the first time period, wherein the application program is any application program in the first application module;

the processor is configured to determine a target database node based on at least one historical database object accessed by the application program in the first time period, wherein the target database node stores the historical database object;

the processor is configured to determine a first application program from the first application module, wherein, the determining the target database node based on at least one historical database object accessed by the application program in the first time period comprises: calculating a data amount proportion of at least one second database node to obtain at least one value, wherein the at least one historical database object is stored on the at least one second database node, and the data amount proportion is a proportion of a data amount that the first application program accesses the historical database object on the second database node in the first time period to a total access amount, wherein the total access amount is a total data amount accessed by the first application program in the first time period, and determining a maximum value in the at least one value, wherein a database node corresponding to the maximum value is the target database node; and the processor is configured to run the first application program on the target database node in a second time period.

9. The apparatus according to claim 8, wherein the processor is configured to collect running information of the database cluster system in real time, wherein the running information of the database cluster system comprises load information of the database cluster system and information about communication performance of the database cluster system; and wherein, the processor is further configured to determine, based on the running information of the database cluster system, whether the application program runs on the target database node in the second time period.

10. The apparatus according to claim 9, wherein the processor is further configured to:
  determine that the application program runs on the target database node in the second time period when the communication performance of the database cluster system meets a first condition.

11. The apparatus according to claim 9, wherein the processor is further configured to:
  determine that the application program runs on the target database node in the second time period when CPU utilization of the first database node exceeds a second threshold.

12. The apparatus according to claim 8, wherein the at least one historical database object is stored on the at least one second database node; and
  the processor is further configured to:
  determine the target database node from the at least one second database node according to a preset mapping relationship, wherein the mapping relationship is a relationship between the application program and a database node capable of running the application program.

13. The apparatus according to claim 8, wherein the at least one historical database object is stored on the at least one second database node; and
  the processor is further configured to:
  determine the target database node from the at least one second database node based on a second application module, wherein an application program in the second application module runs on the target database node, and the application program and the application program in the second application module are application programs of a same type.

14. The apparatus according to claim 8, wherein the processor is configured to periodically detect running information of the application program, wherein the running information of the application program comprises database node information accessed by the application program.

* * * * *